Sept. 28, 1943.  M. A. RUDD ET AL  2,330,386
PHOTOGRAPHIC FACSIMILE RECORDER
Filed Feb. 1, 1941   4 Sheets-Sheet 1

INVENTORS
M.A. RUDD
E.V. MOTT
BY  L.H. ROVERE
M J Reynolds
ATTORNEY

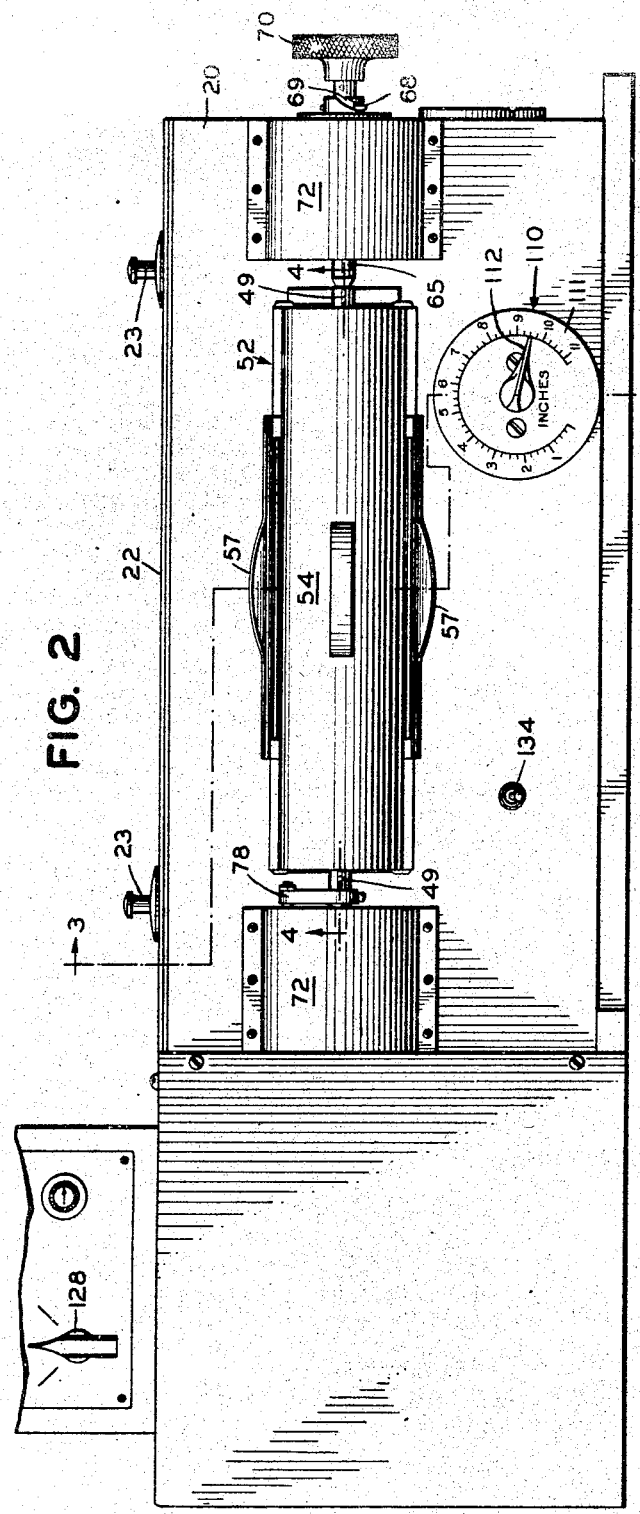
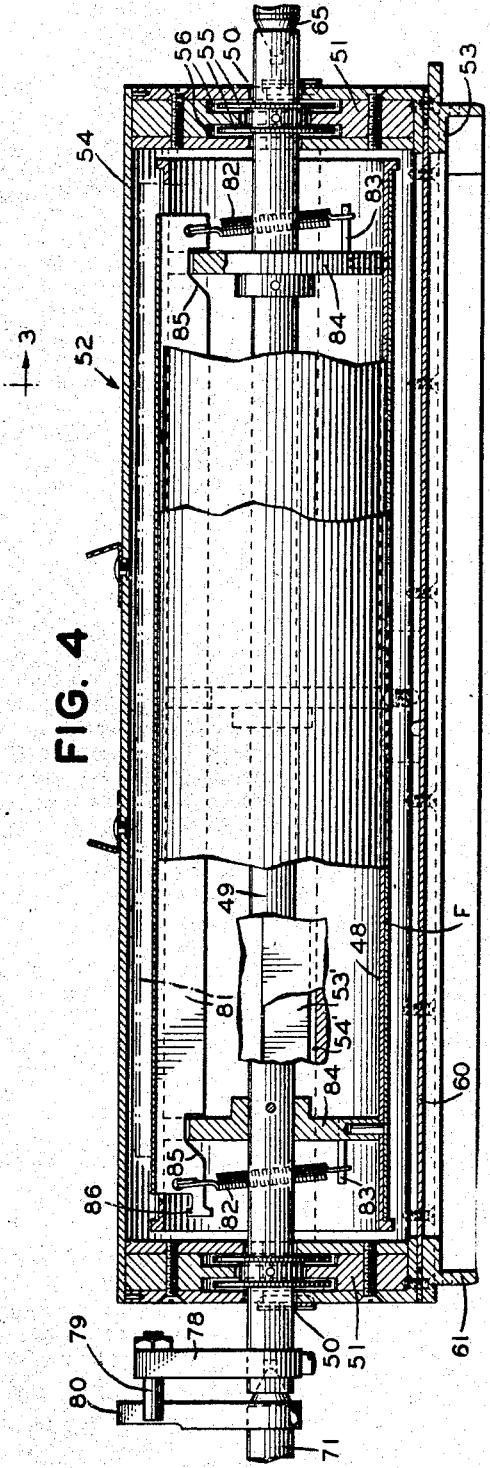

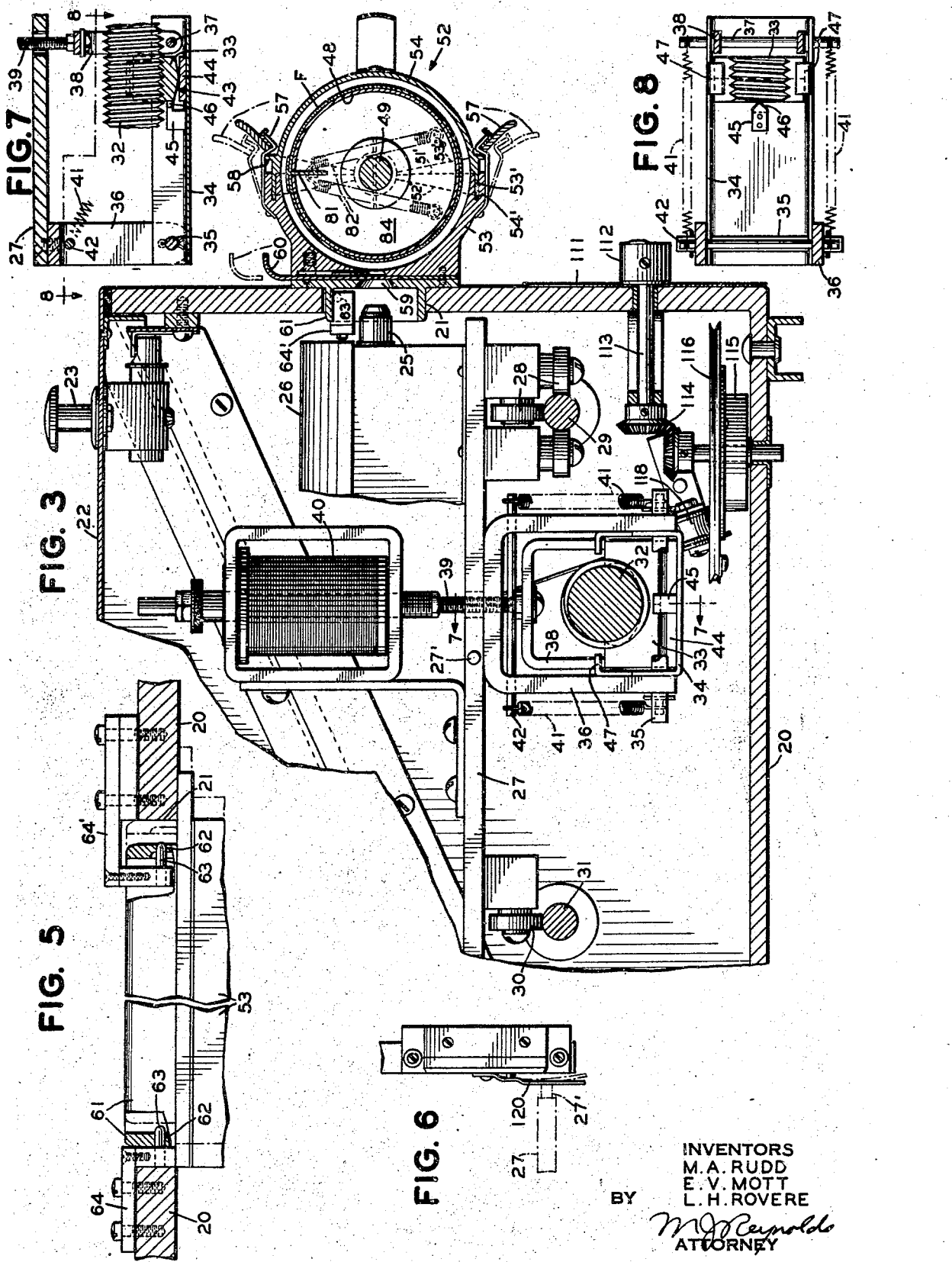

Sept. 28, 1943.    M. A. RUDD ET AL    2,330,386
PHOTOGRAPHIC FACSIMILE RECORDER
Filed Feb. 1, 1941    4 Sheets-Sheet 4
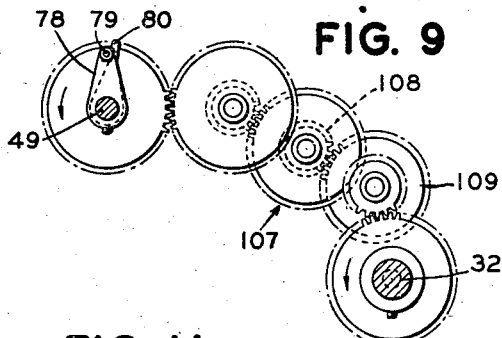
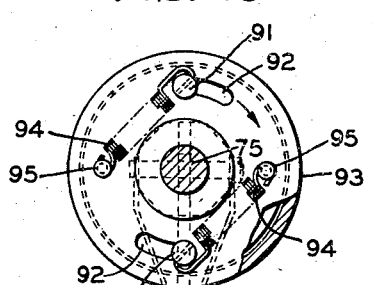
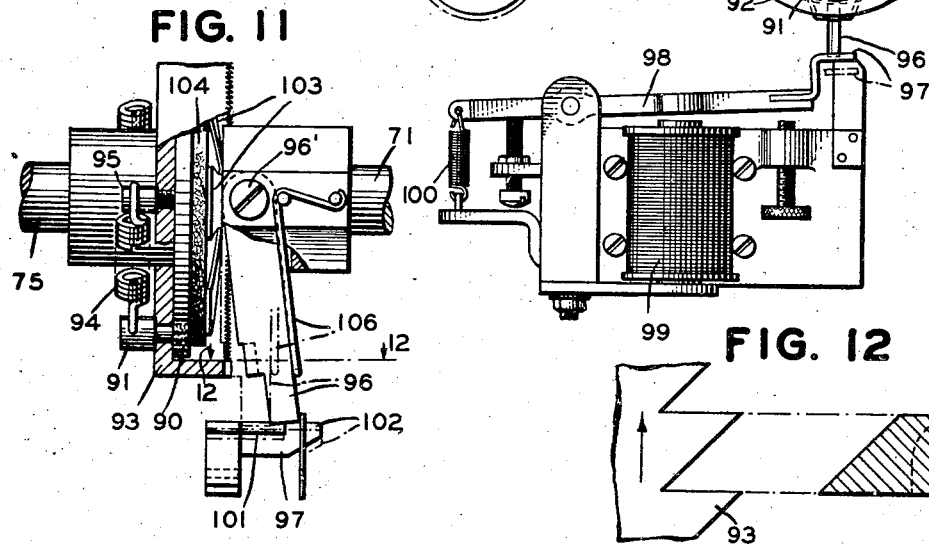
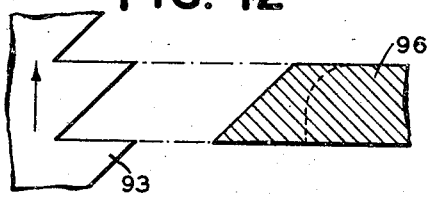
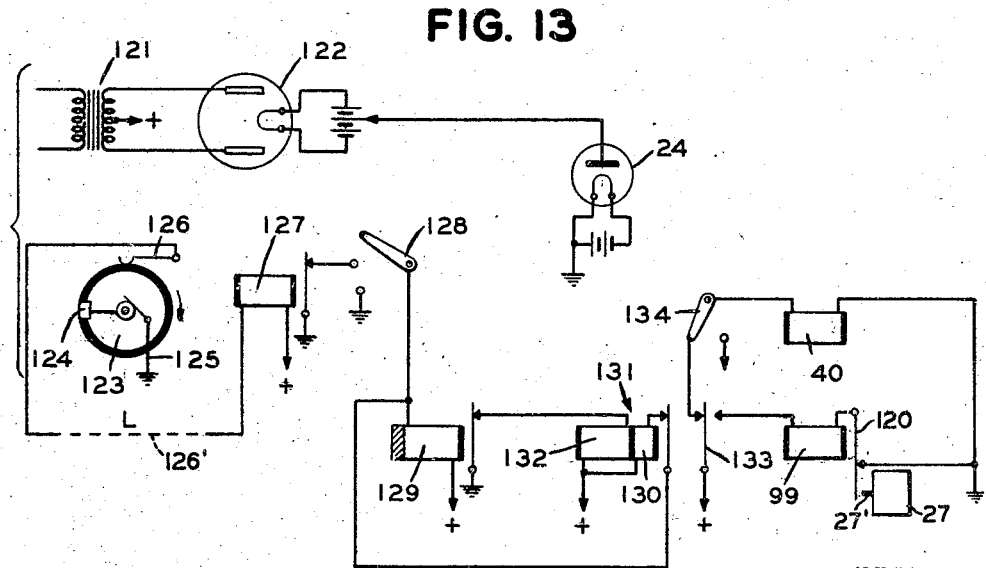
INVENTORS
M. A. RUDD
E. V. MOTT
L. H. ROVERE
BY
M. J. Reynolds
ATTORNEY Patented Sept. 28, 1943

2,330,386

UNITED STATES PATENT OFFICE 2,330,386

PHOTOGRAPHIC FACSIMILE RECORDER

Maurice A. Rudd, North Plainfield, and Everett V. Mott, Metuchen, N. J., and Lewis H. Rovere, Brooklyn, N. Y., assignors to The Western Union Telegraph Company, New York, N. Y., a corporation of New York Application February 1, 1941, Serial No. 376,964

15 Claims. (Cl. 178—13)

This invention relates to facsimile machines and more particularly to a facsimile recorder adapted to record pictures and similar copy.

One well known machine as heretofore employed comprises a scanning mechanism including a scanning light mounted on a movable carriage with a cabinet having a slot in one wall through which slot the light is projected. A photographic film is mounted on a cylindrical holder rotatably mounted in a light-proof housing having a slot in its face, the housing being detachably mounted on the cabinet with the slots juxtaposed so that the longitudinally moving scanning light can be effective upon the rotating film.

An object of this invention is to provide a machine of the type set forth having improved and novel features of construction resulting not only in greater ease of manufacture at less cost but also in improved and simplified operation.

This and other objects which will be apparent to those skilled in the art are accomplished by the present invention, one embodiment of which is illustrated in the accompanying drawings in which:

Fig. 2 is a front elevation of the recorder illustrated in Fig. 1 showing the housing for the film or copyholder in place, as well as the scanning indicator;

Fig. 3 is a transverse section on the line 3—3 of Fig. 2;

Fig. 4 is a vertical section on the line 4—4 of Fig. 2 showing on an enlarged scale through the copyholder and its housing, parts being broken away;

Fig. 5 is a view partly in section showing the means for mounting the copyholder housing on the cabinet;

Fig. 6 is a section taken on the line 6—6 of Fig. 1, showing a detail of a switch mechanism;

Fig. 7 is a section taken on the line 7—7 of Fig. 3, showing the half-nut support;

Fig. 8 is a section taken on the line 8—8 of Fig. 7;

Fig. 9 is a section taken on the line 9—9 of Fig. 1;

Fig. 10 is a section taken on the line 10—10 of Fig. 1;

Fig. 11 is a detail view of the clutch mechanism;

Fig. 12 is a section taken on the line 12—12 of Fig. 11; and

Fig. 13 is a wiring diagram showing the circuits for the electrical operating and control elements.

Figure 1:
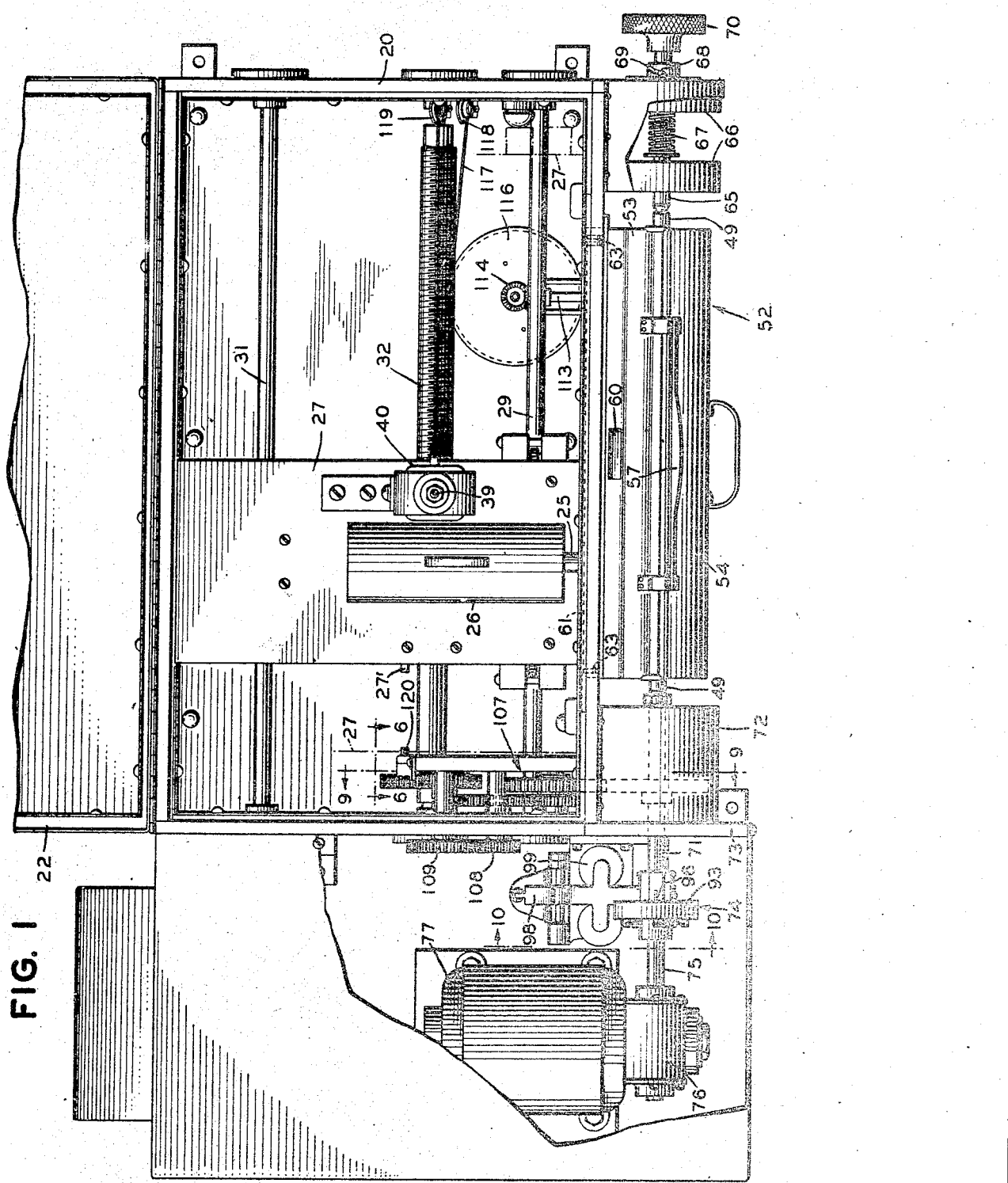
Fig. 1 is a plan view of a facsimile recorder constructed in accordance with one embodiment of this invention, the cabinet enclosing the scanning mechanism being open and the cover to the motor housing being partly broken away to show the parts.

The illustrated embodiment of the invention includes a light tight cabinet 20 having a horizontal slot 21 in the front wall, and a cover 22 clamped in place by any suitable latching means 23. The scanning mechanism consists of a recording lamp 24 (shown diagrammatically in Fig. 13) and associated lens system 25, both mounted in a box 26 secured to a carriage 27 movably supported by rollers 28, engaging the sides and top of a front guide bar 29 extending across the interior of the cabinet 20, and a roller 30 engaging a parallel rear guide bar 31. A carriage feed screw 32 is rotatably mounted in the cabinet parallel to the guide bars for feeding the scanning mechanism therealong during the scanning operation. For this purpose the carriage is periodically connected to the screw by a half-nut 33 supported in one end of an elongated cradle 34, see Figs. 7 and 8, for movement into and out of engagement with the screw shaft. The cradle is pivoted for swinging movement about a rod 35 supporting one end of the cradle in the arms of an inverted U-shaped hangar 36 rigidly secured to the bottom of the carriage 27. The other end of the cradle, in which the half-nut is positioned, is similarly supported by a rod 37 in the arms of an inverted U-shaped hanger 38 secured to an extension of the vertically movable core 39 of the half-nut release solenoid 40 mounted on the top face of the carriage 27, the core extension passing downwardly through a suitable opening in the carriage, see Fig. 3.

The half-nut is spring pressed upwardly into engagement with the screw shaft by springs 41 connecting the ends of the rod 37 with a spring supporting rod 42 mounted in the top of the inverted U-shaped hangar 36. The bottom face 43 of the half-nut is beveled from the center outwardly as shown in Fig. 7, and rests on a bearing plate 44. A thrust member 45 rigidly secured to the cradle has a point 46 engaging the end face of the nut approximately on a level with the bottom of the thread. As a result the nut more or less floats in the cradle and can rock in a place coinciding with the screw shaft axis and in a plane at right angles thereto. This permits the nut to automatically adjust itself to the thread of the screw shaft when it is yieldingly moved into engagement therewith by the springs 41. Bracket arms 47 carried by the cradle 34 overhang the half-nut at each side to retain the same in the cradle.

The illustrated embodiment shows a facsimile machine adapted to record photographically upon a copy sheet in the form of a photographic film. The film F is wrapped around a rotary copyholding drum 48 mounted on a supporting shaft 49 extending loosely through openings 50 in the end walls 51 of a lightproof housing 52 formed in two sections, a base 53 and a cover 54. The end walls 51 are split on staggered radial lines through the shaft opening, half of each wall being secured to the base 53 and half to the cover 54 so that upon removal of the cover the drum and shaft can be easily lifted out and the film or other copy sheet changed. A lightproof joint between the base and cover is formed by tongues 53' on the cover fitting in slots 54' in the base.

Light traps are provided at each end wall opening to prevent access of light into the housing when the parts are assembled. As illustrated, spaced discs 55 are mounted on each end of the drum shaft and corresponding spaced and staggered disc receiving slots 56 are formed in each end wall of the cover and base to provide an effective means for preventing the entrance of light through the shaft openings. Each end wall 51 is split on three different planes to increase the capacity of the joint to shut out light. The outer edge of each end wall is split on a line 51', see Fig. 3; the intermediate portion between the slots 56 is split on a line 52' at an angle of about 15% to the line 51'; while the inner edge is split on a line 53' at a similar angle to the line 51' on the opposite side thereof from the line 52'.

Spring clips 57 or the like, secured to the housing base 53 and engaging shoulders 58 on the cover 54 are provided for securing the housing parts together.

The base member 53 has an elongated slot 59 extending longitudinally thereof and a sliding shutter 60 is provided for closing the slot when the housing is not in position on the cabinet.

The drum housing is arranged to be mounted on the cabinet with the slots 21 and 59 in juxtaposition, see Fig. 3. As illustrated, this is accomplished by a rectangular flange 61 forming an extension on the housing base and enclosing the slot 59. The flange extension has a hole 62 in each vertical end portion, see Fig. 5, adapted to receive holding pins 63 mounted on brackets 64 which are so mounted on the cabinet wall as to locate the pins in the cabinet slot 21 in position to engage the holes 62 when the flange of the drum housing is inserted in the slot as indicated by dotted lines in Fig. 5 and moved longitudinally. For this purpose the housing flange 61 is somewhat shorter than the cabinet slot 21, and one of the pins 63 is mounted on an extension bracket 64'.

Means are provided for rotatably supporting the drum shaft 49 independent of the drum housing and in exact parallel with the screw feed 32 and the scanning carriage supporting rods 29 and 31. As illustrated, this is accomplished by shaft supporting centers mounted on the front of the cabinet 20. A dead center 65 supported in bearing brackets 66 is spring pressed into shaft engaging position by a helical spring 67 operating between one of the brackets and a collar secured to the center shaft. A pin 68 on the shaft is received in a cam slot 69 in a collar on one of the brackets and a thumb wheel 70 is secured to the outer end of the shaft. By this means rotation of the shaft by the wheel 70 will cause the pin to ride out of the cam slot 69 and onto the face of the collar, thus retracting the dead center and holding it in retracted position. A live center shaft 71 is adapted to support the opposite end of the drum shaft. It extends through a gear box 72 mounted on a panel 73 and is connected through a clutch 74 with a shaft 75 driven through a worm drive 76 by a motor 77.

Inasmuch as the drum shaft 49 extends loosely through the end walls of the housing, it is free to adjust itself to accurate alignment with the centers which support the drum in the exact position required for proper scanning regardless of variations in the dimensions of the housing and associated parts.

The end of the drum shaft supported by the live center has an arm 78 secured thereto and extending radially outward. A pin 79 secured in the arm extends into the path of an arm 80 extending radially outward from the live center shaft 71.

The film clamping device is illustrated as a T-shaped clamping bar 81 extending through a slot in the drum surface and longitudinally of the drum, the arms of the T being drawn into film clamping engagement against the drum face by springs 82 connected to each end of the clamping bar and to pins 83 secured in spaced collars 84 on the drum shaft. The bar is provided with cam surfaces 85 adjacent each collar and finger grip 86 at one end. When the drum is removed from the housing the bar can be pressed longitudinally of the drum, to the right in Fig. 4, to lift the arms of the T into the dotted line position and out of engagement with the drum face. When so positioned the exposed film can be removed and a new film put in place by wrapping around the drum with its edges in position on each side of the bar to be engaged by the T arms when the bar is retracted to the left in Fig. 4. Preferably, the arms of the T-bar are so formed that the outer edges only engage the film.

The loading and unloading of the film on the drum is, of course, done in a dark room. When the drum is loaded, it can be placed in the housing which when closed, and the shutter 60 closed, is light proof.

The clutch (Figs. 10 and 11) through which the shaft 75, driven from the motor, drives the live center shaft 71 comprises a collar 90 secured to the motor drive shaft 75 and provided with pins 91 extending through arcuate slots 92 in a toothed wheel 93 rotatably mounted on the collar. Helical springs 94 connect the collar pins 91 to similar pins 95. The pins 91 are secured to the slidable disc 90 and the pins 95 are attached to the toothed wheel 93. A clutch lever 96 is secured to the center shaft 71 and extends radially outward in position to engage the clutch teeth of the toothed wheel 93. A clutch stop pawl 97 is supported on one end of an armature 98 of a phasing magnet 99, a spring 100 biasing the armature into clutch disengaging position. When the magnet is energized the pawl is retracted out of the path of movement of the clutch lever so that it may engage the toothed wheel to turn the drum. When the magnet is deenergized the spring 100 lifts the pawl into the path of the lever 96. Upon striking the pawl the clutch lever rides along the cam face 101 of the pawl and is thereby disengaged from the toothed wheel. When the lever strikes the stop face 102 of the pawl, movement of the lever and of the shaft 71, and consequently of the drum 48, is arrested. To assure movement of the clutch lever into engagement with the stop face 102, a friction drive between the motor driven shaft 75 and the center shaft 71 is provided. As illustrated, this consists of radial spring arms 103 on the center shaft 71 pressing a friction disc 104 against the collar 90 secured to the driving shaft 75, see Fig. 11. As a result, rotation of the center shaft and associated clutch lever 96 is continued by the friction drive even after the lever is disengaged from the toothed wheel, until it strikes the stop face 102 on the pawl.

When the phasing magnet is energized the armature is shifted against the tension of the spring 100 and the stop pawl 97 is moved to free the clutch lever 96 which is then pressed into engagement with the rotating toothed wheel by a spring 106. The resilient spring connection 94 between the collar 90 and wheel 93 prevents shock as a result of the sudden engagement of the clutch. Clutch lever 96 can be adjusted angularly with respect to arm 80 by means of the set screw 96', thereby "framing" the copy with the borders coming under the clamping bar 81.

The motor 77 drives the live center shaft 71 and the copyholding drum 48 at proper scanning speed. The screw feed shaft 32 is driven from the live center shaft through a reduction gear train 107, see Figs. 1 and 9, most of the gear elements of which are mounted in the cabinet 20. Obviously, the number of scanning lines per inch is determined by the number of threads per inch, and the speed of rotation of the feed screw 32 relatively to the drum 48, and this, in turn, is determined by the gear ratio. In order to render the number of scanning lines per inch readily variable and adaptable to different types of copy being recorded, a pair of change speed gears 108 and 109 forming a part of the gear train 107 are mounted in a readily accessible position on the outside of the cabinet 20. By changing these gears the machine can be quickly adapted to scan 60, 75, 85, 100 or any other number of lines per inch.

In order to indicate the number of inches of copy that the machine has scanned at any given moment during operation without requiring the operator to open the cabinet 20, a scanning indicator 110 in the form of a dial 111 and pointer 112 is located on the front wall of the cabinet. The pointer 112 is secured to the projecting end of a shaft 113 extending into the cabinet and geared through bevel gears 114 to the shaft of a spring drum 115 having a pulley 116 on the same shaft. A drum operating cable 117 connects the scanning mechanism carriage 27 with the pulley 116 over suitable cable guide rollers 118 and 119. Scanning movement of the carriage causes the spring drum to rotate and shift the pointer to show the number of inches the carriage has moved. The spring drum also provides a load on the half-nut eliminating all backlash as well as returning the carriage to its starting position when the half-nut is disengaged. A dashpot absorbs the shocks of the returning carriage just before it hits its stop.

The operation of the receiver is terminated at the end of each recording by a manually operated switch 128, but a second switch 120, see Figs. 1 and 6, is provided in a position to be engaged by an extension 27' of the carriage at the end of its useful travel in the cabinet for the purpose of deenergizing the phasing magnet to stop the carriage feed and drum rotation to prevent damage to the parts should the operator fail to discontinue the operation of the recorder at the proper time.

Fig. 13 shows the wiring diagram for the recorder. Facsimile signals received from a remote point over land lines and/or over a submarine cable, as for instance in the manner disclosed in the copending application of Milnor et al., Ser. No. 254,622, filed March 28, 1939, are suitably amplified to the required recording level. The amplifier, not shown, may terminate in a transformer 121 coupled to a full-wave rectifier 122, from which the rectified signals are impressed upon the electrodes of the luminous discharge lamp 24. The scanning light 24, which is thus operated by the incoming signals, records an exact reproduction of the copy being transmitted upon the film secured to the rotating drum.

The distant control for operating the phasing magnet circuit for the machine comprises a rotary commutator 123 of insulating material having a conducting segment 124 grounded through a conductor 125. A brush 126 is connected through a suitable signaling circuit to the receiving station and to battery through a relay coil 127, having a grounded armature, the back contact of which is connected to the center tap of a three-position switch 128. The switch arm 128 is connected through a slow release relay 129 to battery, and also to battery through armature and front contact and the locking coil 130 of relay 131. The operating coil 132 of the relay 131 is connected to battery on one side and to ground on the other through the armature and back contact of the slow to release relay 129. The relay 131 also controls the circuit of the half-nut magnet 40, and the clutch or phasing magnet 99, through its armature 133 and its front and back contacts, respectively. A toggle switch 134 is provided in the circuit of the half-nut magnet to provide manual control of the carriage return mechanism should it be necessary to re-run a recording without making it necessary to rephase. The phasing magnet circuit includes the micro-switch 120 arranged as heretofore described so as to be engaged by the carriage extension 27' at the end of its travel to deenergize the phasing magnet 99 to cause disengagement of the clutch 74 in case the operator fails to operate the switch 128 or 184 at the proper time, to interrupt operation of the recorder.

In operation, the recording drum 48 is removed from the housing 54 and the film clamping T-bar 81 is shifted to the right as shown in Fig. 4 to lift it into the dotted line position. A film sheet is wrapped around the drum and the clamping T-bar returned to film holding position in which the arms of the T engage the edges of the film lying on each side thereof. The drum is placed in the housing which is then closed. The shutter 60 being closed, the light proof joints between the housing base 53 and cover 54, and the light traps at each end of the drum shaft, prevent the entrance of any light into the housing. This loading operation is, of course, carried out in a dark room. The housing is then mounted on the cabinet by inserting the flange 61 in the cabinet slot 21 and shifting it to engage the pins 63 in the holes 62. The dead center shaft is released from its inoperative position by rotating thumb wheel 70 to move the pin 68 into the slot 69 to permit the spring 61 to shift the center into engagement with the adjacent end of the drum shaft 49. The other end of the drum shaft is supported on the live center shaft 71. Inasmuch as the drum shaft extends loosely through the housing walls, it is free to be accurately positioned by the supporting centers which hold it in exact focus and in parallelism with the guide rods 29 and 31 for the scanning carriage.

Referring to Fig. 13, the conductive segment 124 of the commutator 123 is of a width corresponding to the period of overlap of the picture on the transmitting drum. The commutator is rotated in synchronism with the transmitting drum as described in the aforesaid application of Milnor et al. The conductive segment wipes the brush 126 during the overlap interval when no picture signals are being transmitted. In case of ocean cable operation, the commutator 123 is phased with the incoming signals in any desired manner, as by means of an oscillograph so as to bring the traversing of the segment 124 by the brush 126 during the overlap or no signal interval. In the case of land line operation the commutator 123 may be disposed at the transmission point and the brush 126 extended to the relay 127 over the conductor 126'. The drum 48 is phased or framed by rotating the clutch arm 96 collar with respect to shaft 71 until the clamping bar 81 is in front of the scanning mechanism at the time the phasing magnet is energized by the pulse from the commutator 123.

When the machine is idling, in readiness for a recording operation, the toggle switch 134 is closed as shown in Fig. 13, and the three-position switch is on its upper or dead contact. In this position of switch 128, relay 129 is deenergized and the operating winding of relay 131 is energized through the armature and back contact of relay 129. The half-nut magnet 40 is thus energized through the armature 33 and front contact of relay 131 and the half-nut held disengaged from the screw feed shaft 32. The carriage is, therefore, held in its forward position by the spring drum 115 and cable 117, in position to start a recording operation. When a recording operation is to be commenced, the three-position switch 128 is moved from its idle position to the center or phasing position. This puts battery on the winding of relay 129, thus interrupting the circuit to the operating winding of relay 131. Relay 131 remains operated, however, since the circuit through the locking coil 130 thereof is also completed at this time through the switch 128. When the segment 124 in the commutator wipes brush 126, a pulse is sent over the conductor 126' through the coil 127, which thereupon momentarily opens the circuit to relay 129 and the locking winding 130 of relay 131. Relay 129, being slow to release, is not affected by this momentary interruption but relay 131 releases its armatures. Operation of armature 133 to its back contact opens the circuit of the half-nut magnet permitting the springs 41 to move the half-nut into engagement with the screw feed shaft 32 to begin feeding the carriage. At the same time the battery is applied to the phasing or clutch magnet 99 to effect the removal of the step pawl 97 out of engagement with the clutch lever 96, whereupon the clutch is engaged to cause rotation of the drum in phase with the transmitting drum. After operation is begun the switch arm 128 of the three-position switch may be shifted to the recording position in engagement with the lower or grounded contact, although it will be apparent that leaving the switch in phasing position will not affect the operation of the machine unless the phasing circuit 126' becomes grounded, as the repeated pulses caused by the rotating armature 124 have no further effect on the system.

When scanning is completed the operator shifts the switch 128 back to its dead contact which causes release of relay 129 and reenergizing of the operating coil 132 of relay 131 whereupon armature 133 is operated to interrupt the circuit to phasing magnet 99 and complete the circuit to the half-nut magnet 40. The drive clutch 74 is thus disengaged and the carriage is again returned to its normal position. Should the operator fail, for any reason, to throw the switch 128 at the proper time so that the carriage is permitted to continue to the extreme limit of its travel, the extension 27' thereof will engage and operate the stop switch 120 so as to deenergize the phasing magnet 99 and disconnect the clutch 74.

It will be apparent that the invention can be variously modified and adapted within the scope of the appended claims.

We claim:

1. The combination in a facsimile machine of a scanning mechanism, a cabinet therefor, a recording drum mounted on a supporting shaft, a housing for said drum having openings in the end walls through which said shaft extends loosely, and means for preventing the entrance of light into said housing through said openings including a disc on said shaft adapted to extend into a radially extending slot in the housing wall loosely receiving said disc.

2. The combination in a facsimile machine of a scanning mechanism, a cabinet therefor, a recording drum mounted on a supporting shaft, a two part housing having split end walls provided with openings through which said shaft extends loosely, said split end walls permitting ready removal of said drum from said housing, and means for preventing the entrance of light into said housing through said openings including loosely interengaging radially extending members on said shaft and on the walls of said housing forming a light trap.

3. The combination in a facsimile machine of a rotatable slotted drum adapted to hold a copy sheet, a radially movable T-bar mounted in the slot of said drum for clamping the edges of a copy sheet in place, a cam face associated with said bar for radially moving said bar to release a copy sheet when said bar is shifted longitudinally of said drum in one direction, and means for pressing said bar radially inward to clamping engagement when shifted longitudinally in the other direction.

4. The combination in a facsimile machine of scanning mechanism, a cabinet enclosing said mechanism, a copy holder, a housing therefor, means for producing relative movement between said mechanism and holder for scanning, and localized means exterior of said cabinet and housing for indicating the extent of scanning movement at any instant.

5. The combination in a facsimile machine of scanning mechanism, a cabinet enclosing said mechanism, a copy holder, a housing therefor, means for producing relative movement between said mechanism and holder for scanning, and means exterior of said cabinet and housing for indicating the extent of scanning movement at any instant including a spring drum for operating said indicating means and a cable actuated by said movement for operating said drum.

6. The combination in a facsimile machine of driving mechanism including a motor operated driving shaft having a toothed wheel thereon, a driven shaft having a toothed wheel engaging lever pivoted thereon, means pressing said lever into engagement with said wheel for connecting said shafts, a magnetically controlled stop for operating said lever to disengage said clutch, and a yielding connection between said driving shaft and said toothed wheel.

7. The combination in a facsimile machine of driving mechanism including a motor operated driving shaft having a toothed wheel thereon, a driven shaft having a toothed wheel engaging lever pivoted thereon, means pressing said lever into engagement with said wheel for connecting said shafts, a magnetically controlled stop including a cam face adapted to be located in the path of said lever to move said lever and disengage said clutch and a stop face for subsequently stopping said lever and driven shaft in a definite position after disengagement.

8. The combination in a facsimile machine of driving mechanism including a motor operated driving shaft having a toothed wheel thereon, a driven shaft having a toothed wheel engaging lever pivoted thereon, means pressing said lever into engagement with said wheel for connecting said shafts, a magnetically controlled stop including a cam face adapted to be located in the path of said lever to move said lever and disengage said clutch, and a stop face for stopping said lever and driven shaft in a definite position after disengagement, and a friction drive between said shafts to move said lever along said cam face and against said stop.

9. The combination in a facsimile machine of a scanning device, a carriage movably supporting said mechanism for scanning movement, a cabinet enclosing said device and said carriage, a rotatable copy holder, means for moving said carriage relative to said holder for scanning including a gear train having accessible change speed gears to vary the rate of movement of said carriage relative to said holder.

10. The combination in a facsimile machine of a scanning device, a carriage movably supporting said mechanism for scanning movement, a cabinet enclosing said device and said carriage, a rotary copy holder, a screw feed for moving said carriage for scanning, means for rotating said holder, and a reduction gear train for operating said screw feed from said holder having accessible change speed gears located outside of said cabinet to vary the speed of said screw feed relative to that of said rotary copy holder.

11. The combination in a facsimile machine of scanning mechanism including a movable carriage, a rotatable screw shaft for moving said carriage, mechanism for connecting said carriage to said screw shaft including a half nut, and means supporting said half nut so as to allow rocking movement thereof in a plane including the axis of said screw and in a plane at right angles thereto.

12. The combination in a facsimile machine of scanning mechanism including a movable carriage, a rotatable screw shaft for moving said carriage, mechanism for connecting said carriage to said screw shaft including a half nut, a cradle for loosely supporting said nut, rocking surfaces between said nut and said cradle permitting said nut to rock in a plane including the axis of said screw shaft, and a thrust member against which said nut bears having a nut engaging fulcrum permitting said nut to rock in a plane at right angles to said first named plane.

13. The combination in a facsimile machine of scanning mechanism including a movable carriage, a rotatable screw shaft for moving said carriage, mechanism for connecting said carriage to said screw shaft including a half nut, a movable cradle for loosely supporting said nut, rocking surfaces between said nut and said cradle permitting said nut to rock in a plane including the axis of said screw shaft, and a thrust member against which said nut bears having a nut engaging fulcrum engaging the end face of said nut on a level with the bottom of the thread therein permitting said nut to rock in a plane at right angles to said first named plane.

14. The combination in a facsimile machine of scanning mechanism, a cabinet enclosing said mechanism, a copy holder, a housing therefor, means for producing relative movement between said mechanism and holder for scanning, means exterior of said cabinet and housing for indicating the extent of scanning movement at any instant, and secondary driving means between said scanning mechanism and said indicating means for restoring said scanning mechanism and said indicating means to respective initial positions.

15. The combination in a facsimile machine of scanning mechanism, a cabinet enclosing said mechanism, a copy holder, a housing therefor, means for producing relative movement between said mechanism and holder for scanning, and means exterior of said cabinet and housing for indicating the extent of scanning movement at any instant including a spring drum for operating said indicating means and a cable actuated by said movement for operating said drum, said spring drum restoring said scanning mechanism and said indicating means to respective initial positions.

MAURICE A. RUDD.
EVERETT V. MOTT.
LEWIS H. ROVERE.